United States Patent
Cantrell

[11] 3,949,396
[45] Apr. 6, 1976

[54] FAST SCAN MULTIMODE RADAR
[75] Inventor: Ben H. Cantrell, Oxon Hill, Md.
[73] Assignee: The United States of America as represented by the Secretary of the Navy, Washington, D.C.
[22] Filed: Feb. 25, 1975
[21] Appl. No.: 552,895

[52] U.S. Cl. .................................. 343/5 R; 343/6 R
[51] Int. Cl.² ........................................... G01S 9/02
[58] Field of Search ............................ 343/5 R, 6 R

[56] References Cited
UNITED STATES PATENTS
2,997,706  8/1961  Easy et al. ........................... 343/5 R
3,836,966  9/1974  Frisbee, Jr. ....................... 343/5 R X Primary Examiner—T. H. Tubbesing
Attorney, Agent, or Firm—R. S. Sciascia; Arthur L. Branning; George A. Montanye

[57] ABSTRACT

A new system and technique for providing multi-mode radar operation from a single scanning radar antenna at conventional scan rates. A single radar antenna has a plurality of feeds forming individual main-lobe beams equal in number to the number of radar modes to be utilized. Each of the beams is separated in azimuth by a fixed angle $\theta$, and rotate together at the scan rate of the antenna. For each angle $\theta$ that the antenna rotates the radar mode is changed so that the antenna feeds are cyclically multiplexed to each of the radar modes desired.

9 Claims, 5 Drawing Figures

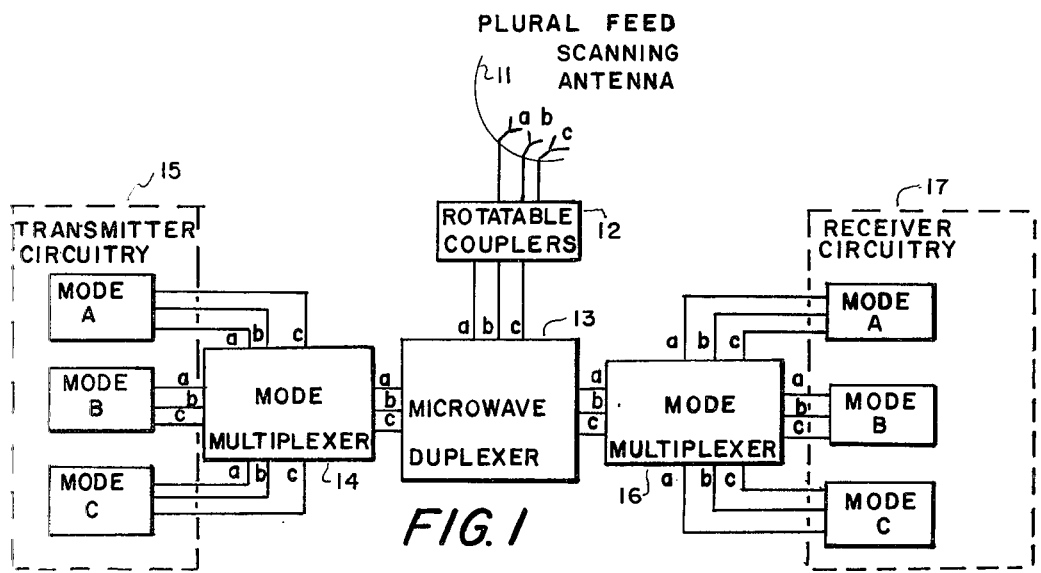

FAST SCAN MULTIMODE RADAR

BACKGROUND OF THE INVENTION

The present invention relates to improvements in data acquisition in scanning radar systems and more particularly to a new system and technique for providing multi-mode radar viewing with a single scanning radar antenna.

In the prior art, a variety of different radar modes could be used to provide the best possible information for any given operational environment. Depending on the terrain, weather conditions, type of target being viewed, and various other factors, any given radar will provide information that will be highly accurate and useful for some purposes and insufficient for others. While in some instances a plurality of different radars can be combined to obtain the best characteristics of each radar type, the restrictions imposed by hardware and space limit the number of modes that can be used economically and efficiently, and increase the complexity of the overall system.

As an alternative to a plurality of separate radars, it is known to use a scanning two-dimensional search radar which can be operated in several modes such as pulse doppler, MTI, frequency agile, or other known radar modes. While such a system can reduce the cost and complexity of the radar, hardware limitations, such as receiver blockage, restrict operation of the radar to one mode at a time and thereby reduce data acquisition in the radar system. As a result, in order to effectively cover the surveillance volume with all modes of operation, the antenna must be rotated slower, or the mode changed from scan to scan. In either case, very low data rates are obtained for a given mode of operation.

Accordingly, the present invention has been developed to overcome the specific shortcomings of the above known and similar techniques and to provide a system and technique for improving radar data acquisition in a scanning radar.

SUMMARY OF THE INVENTION

It is therefore an object of the present invention to provide a radar system having increased information gathering capabilities.

Another object of the invention is to provide a radar system of reduced complexity, yet highly reliable and versatile in operation.

A further object of the invention is to provide a scanning radar system capable of providing increased data acquisition at conventional scan rates.

Still another object of the invention is to provide a scanning radar system that operates in multiple modes.

Yet another object of the invention is to provide a multi-mode radar system using plural beams from a single antenna.

In order to accomplish the above and other objects, the present invention employs a single scanning antenna having a plurality of feed elements for forming multiple beams. Radar transmitter and receiver circuits are constructed to provide a plurality of operational modes, with each mode transmitting a plurality of slightly different frequencies equal in number to the number of modes to be utilized. Mode multiplexers are coupled to the duplexer circuitry, and to the transmitter and receiver circuitry, to connect each mode to transmit and receive said plurality of different frequencies over an equal number of feed elements. Each of the feed elements is coupled to provide a main lobe beam such that each of the beams is spaced in azimuth by a fixed angle $\theta$ of several beamwidths. As the antenna scans, all of the beams are rotated together at a scanning speed $\omega$ and the multiplexers are operated to couple a different radar mode to the antenna during each angle $\theta$ that the antenna rotates. By cyclically multiplexing each different mode to the antenna to produce plural beams, information from the plurality of modes is received without requiring a change in the scan rates or reducing data acquisition. In addition, since the beams are supplied through a single antenna to which the radar modes are coupled one at a time, problems with receiver blockage are eliminated and the system complexity is reduced.

Other objects, advantages, and novel features of the invention will become apparent from the following detailed description of the invention when considered with the accompanying drawings wherein:

BRIEF DESCRIPTION OF THE DRAWINGS

FIG. 1 is a schematic diagram of the multi-mode scanning radar according to the present invention.

FIGS. 2a–2d are schematic diagrams showing the antenna feed pattern and the manner in which a target is detected by multiple modes.

DETAILED DESCRIPTION OF A PREFERRED EMBODIMENT

Referring now to FIG. 1, a schematic diagram shows the scanning radar system according to the present invention. Generally, the system includes a scanning radar antenna 11 having a plurality of feed elements $a$, $b$, and $c$, constructed to provide a plural beam pattern similar to that shown in FIG. 2a as will be subsequently described. The antenna could be, for example, an ordinary parabolic reflector utilizing a center feed and two offset feeds, or any other well known antenna structure capable of producing the desired antenna beam pattern as shown. In the example, the feed elements are arranged adjacent one another to produce three narrow main lobe beams $a$, $b$, and $c$ (FIG. 2a), separated in azimuth by a fixed angle $\theta$ of several beamwidths, and rotated together at a speed $\omega$ representing the scanning speed of the antenna 11. While not shown, the antenna can be rotated by any conventional means such as a motor and gear arrangement as would be obvious to one skilled in the art.

The feed elements $a$, $b$, and $c$ are coupled through appropriate transmission lines to rotatable couplers 12 of conventional construction, which, in turn, couples the feed elements through appropriate transmission lines to a microwave duplexer 13. The duplexer 13 can be any well known microwave switching device or radar duplexer for coupling the feed elements $a$, $b$, and $c$ to the transmitter circuitry 15 when the radar is transmitting, and to the receiver circuitry 17 when the radar is not transmitting. The transmitter circuitry 15 is constructed in a well known manner to produce a plurality of different radar transmitting modes A, B, and C such as pulse doppler, MTI, frequency agile, or any other known radar mode. Similarly, the receiver circuitry 17 is constructed in a conventional manner to receive and process radar transmissions in the corresponding radar receiving modes A, B, and C.

According to prior known techniques, each of a plurality of such modes could be multiplexed one at a time to the antenna to produce a single radar beam for each radar mode. As previously mentioned, however, such techniques require slower antenna rotation, or mode changes from scan to scan, with a resulting decrease in data acquisition rates for each of the modes of operation. In contrast, each mode of the present invention forms a plurality of beams through a single antenna to overcome the prior deficiencies.

As shown in FIG. 1, each separate transmit mode is constructed to simultaneously transmit a plurality of slightly different frequencies over transmission lines $a$, $b$, and $c$ to form the plural beams through antenna feed elements $a$, $b$, and $c$. Each corresponding receive mode A, B, and C is likewise constructed to receive simultaneously the plural frequency radar returns from the same feed elements $a$, $b$, and $c$ via corresponding transmission lines $a$, $b$, and $c$. While the receiver circuitry is only schematically represented by modes A, B, and C, such circuitry obviously includes the conventional receivers, processors and display devices necessary to appropriately evaluate the radar returns for each of the different receiver modes. In addition, as previously noted, each of the beam frequencies on feed elements $a$, $b$, and $c$ are slightly different to thereby allow beam separation to be easily obtained.

Turning again to FIG. 1, mode multiplexer 14 is coupled to pass the radar transmissions from each of the transmitting modes A, B, and C to the duplexer 13, while mode multiplexer 16 is coupled to pass the received radar returns to the corresponding receiving modes A, B, and C. The multiplexers can be any conventional solid state or electrical switching circuits operating to serially connect each of the modes, one mode at a time, to the duplexer 13. As is known, the multiplexers can include any clock control or synchronizing circuitry necessary to simultaneously connect the same transmitting and receiving modes to the duplexer for any given mode. According to the present invention, when a given mode is multiplexed by the multiplexers 14 and 16, the plural transmission lines $a$, $b$, and $c$, of both the transmitter and receiver circuitry of that mode, are all simultaneously coupled to the duplexer 13. In addition, the multiplexers are set to switch the mode of operation every time the antenna rotates the beams through an angle $\theta$, and cyclically repeat the switching from mode to mode in the same serial order.

The operation of the system will now be described with particular reference to FIGS. 2a–2d. As can be seen from FIG. 2a, the antenna feeds are located, as previously described, to produce three beams in azimuth separated by a fixed angle $\theta$ of several beamwidths. The beams are directed to have the same elevation angles such that each beam would sweep through the same surveillance volume as each other beam if the antenna were rotated through one scan in a single mode. At a time $t_o$, the positions of the antenna beams and a target are shown in FIG. 2b, and it is assumed that the radar system is switched to operate in mode A, while the antenna is rotated at an angular velocity $\omega$. Between the time $t_o$ and $t_o + \theta/\omega$, the mode of operation is A, and the $a$ beam sees a target while each beam sweeps through an angle $\theta$. At the time $t_a + \theta/\omega$, the radar is switched to operate in mode B, and the b beam sees the same target while each beam sweeps through an angle $\theta$ during the time $t_o + \theta/\omega$ and $t_o + 2\theta/\omega$. At the time $t_o + 2\theta/\omega$, the radar switches to operate in mode C, and the c beam sees the same target while each beam again sweeps through an angle $\theta$ during the time $t_o + 2\theta/\omega$ and $t_o + 3\theta/\omega$. At the time $t_o + 3\theta/\omega$ the radar switches back to operate in mode A and cyclically repeats the mode switching, under the control of multiplexers 14 and 16, at increments of time equal to $\theta/\omega$, during which time each beam rotates through an angle $\theta$.

As can be seen from the above description, a target located in any sector defined by an angle $\theta$, will be viewed by all three modes of operation. This is accomplished without a change in scan rates and thereby allows plural modes of operation to be implemented with only a single scanning radar antenna while still achieving conventional scan rates for all modes of operation. While the scan rate can be increased or decreased in accordance with changing conditions, the effect of the inventive system is to allow increased data acquisition (through multi-mode operation) at a desired scan rate, over prior known techniques. It should be noted, that for targets located near the switching point, a loss of detection will sometimes occur. While this does not represent a significant problem, such a deficiency can be easily overcome by controlling the multiplexers to change the switching points after each complete rotation of the radar antenna.

In accordance with the inventive teachings, the present system can be implemented using conventional elements to eliminate the need for special purpose and complex equipment. It further follows that the present technique leads to savings in cost and an increase in efficiency and allows a reduction in the number of antennas (and related equipment) required where antenna space is at a premium, such as aboard ship, where several different modes of radar operation are required to provide adequate detection over many different environmental conditions.

While the invention has been described with particular reference to the use of three radar modes in the system, the inventive teachings are equally applicable to the multiplexing of two or more modes of operation, as long as the number of beam frequencies, transmitted and processed by each mode, is identical to the number of modes to be multiplexed. It should be further noted, that while only such examples of radar modes were mentioned as to facilitate an understanding of the inventive technique, the present invention can be practiced with any radar mode capable of being operated at different frequencies through plural feeds of the same antenna.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An improved radar system comprising:
   a radar antenna means having plural feed elements for transmitting and receiving radar beams;
   a plurality of mode transmitting means for generating radar frequencies in different radar modes, each of said transmitting means being constructed to generate plural radar frequencies in a given mode;
   a plurality of mode receiving means for receiving and processing radar frequencies in radar modes corresponding to said transmitting modes, each of said receiving means being constructed to receive said plural radar frequencies within each mode;

means for coupling corresponding mode transmitting and receiving means to said antenna means during the same time period such that in each mode said plural radar frequencies are transmitted and received by said plural feed elements.

2. The system of claim 1 wherein said means for coupling includes, multiplexing means for repetitively and sequentially coupling different modes of said corresponding transmitting and receiving means to said antenna means.

3. The system of claim 2 wherein said feed elements are arranged to form directional radar beams in any given mode such that adjacent beams are separated in azimuth by an angle $\theta$ and have the same elevation angle.

4. The system of claim 3 further including, means for rotating said antenna means for scanning said radar beams, and further wherein said means for multiplexing includes, means controlling said multiplexing such that each of the transmitting and receiving means of the same mode are coupled to said antenna means for a time equal to the time required for one of said radar beams to scan through an angle $\theta$.

5. The system of claim 4 wherein each of said plurality of transmitting means is constructed to generate said plural frequencies as plural different frequencies equal in number to the number of radar modes.

6. The system of claim 5 wherein said antenna means comprises a directional radar antenna and further including duplexer means for alternately coupling a transmitting and receiving means of the same mode to said antenna during operation in a given mode.

7. An improved method for obtaining multi-mode radar data acquisition comprising:
establishing a plurality of radar modes for providing radar frequencies in different modes;
generating a plurality of different radar frequencies within each mode;
transmitting in each mode through a single antenna such that said plurality of different radar frequencies in a given mode form adjacent radar beams separated in azimuth by an angle $\theta$ and directed in elevation at the same angles;
controlling the transmitting such that each mode sequentially transmits for a time period equal to the time required for a beam to scan through an angle $\theta$; and
sequentially receiving each mode of said plural different radar frequencies during the same time period that the corresponding mode is transmitting.

8. The method of claim 7 wherein the step of controlling further includes the step of cyclically transmitting each mode in the same sequential order.

9. The method of claim 8 wherein the step of generating includes, generating said plurality of different frequencies equal in number to the number of established radar modes.

* * * * *